United States Patent
Yamamoto et al.

(10) Patent No.: US 6,411,583 B1
(45) Date of Patent: Jun. 25, 2002

(54) SHUTTER MECHANISM FOR DISK DRIVE DEVICE

(75) Inventors: Hiroshi Yamamoto; Suguru Takishima, both of Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/896,533

(22) Filed: Jul. 18, 1997

Related U.S. Application Data

(63) Continuation of application No. 08/662,149, filed on Jun. 12, 1996, now abandoned.

(30) Foreign Application Priority Data

Jun. 13, 1995 (JP) .............................. 7-170234

(51) Int. Cl.[7] .............................................. G11B 33/14
(52) U.S. Cl. ................................... 369/77.2; 369/75.1
(58) Field of Search .............................. 369/75.1, 75.2, 369/77.1, 77.2; 360/137; 49/475.1

(56) References Cited

U.S. PATENT DOCUMENTS

| | | | | |
|---|---|---|---|---|
| 3,800,328 A | * | 3/1974 | Harlan et al. ............... | 360/137 |
| 4,408,321 A | * | 10/1983 | Yamamura ................. | 369/77.2 |
| 4,607,301 A | * | 8/1986 | Iizuka ..................... | 360/137 X |
| 4,725,903 A | * | 2/1988 | Miley ........................ | 360/96.5 |
| 4,817,079 A | * | 3/1989 | Covington .................. | 369/291 |
| 5,229,987 A | * | 7/1993 | Aoki ......................... | 369/77.1 |
| 5,300,763 A | * | 4/1994 | Ito et al. ................. | 369/77.1 X |
| 5,465,532 A | * | 11/1995 | Varin ........................ | 49/493.1 |
| 5,469,665 A | * | 11/1995 | Biebuyck ..................... | 49/470 |

* cited by examiner

*Primary Examiner*—William Klimowicz
(74) *Attorney, Agent, or Firm*—Greenblum & Bernstein, P.L.C.

(57) ABSTRACT

A rectangular shutter leaf is swingably provided to an opening of a front panel of a disk drive device, a cartridge being inserted or discharged through the opening. The shutter leaf is supported to, and swingable about, one side of the shutter leaf. A resilient skirt is provided on all sides of the shutter leaf except the supported side, and extends toward the periphery of the opening. When the shutter leaf is parallel to the front panel and substantially closes the opening, the resilient skirt covers a clearance between the shutter leaf and the opening, preventing the entry of debris or dust into the interior of the disk drive device through the opening.

24 Claims, 8 Drawing Sheets

SHUTTER MECHANISM FOR DISK DRIVE DEVICE

This application is a continuation of application Ser. No. 08/662,149, filed Jun. 12, 1996, now abandoned.

BACKGROUND OF THE INVENTION

Conventionally, removable data recording media, such as optical disks or magnetic disks, are often housed in a cartridge. The cartridge protects the optical or magnetic disk from debris or dust.

A conventional data recording/reproducing device has a disk drive device for holding the cartridge, for opening a cartridge shutter provided on the cartridge, for rotating an optical or magnetic disk housed in the cartridge, and for recording/reading data on the optical or magnetic disk using an optical or magnetic head.

Such a disk drive device further has an insertion opening for inserting or discharging a cartridge. The opening often has a shutter mechanism for preventing debris or dust from entering the interior of the disk drive device.

One conventional shutter mechanism has a swingable shutter leaf. Upon insertion or discharge of the cartridge, the shutter leaf swings inward or outward, pushed by the cartridge.

However, a clearance is provided between the shutter leaf and the insertion opening, in order to prevent contact between the shutter leaf and the peripheral edge of the insertion opening (to obtain smooth movement of the shutter leaf). Therefore, debris or dust may enter the interior of the disk drive device through the clearance.

SUMMARY OF THE INVENTION

It is therefore an object of the present invention to provide a shutter mechanism for a disk drive capable of preventing the entry of debris or dust through a clearance between an insertion opening and a shutter leaf of a disk drive device, when the shutter leaf closes the insertion opening.

According to one aspect of the invention, there is provided a shutter mechanism, including a shutter leaf, swingably provided to a disk cartridge insertion opening. The shutter leaf has at least one resilient skirt along a portion of a periphery of the shutter leaf. The resilient skirt extends toward the periphery of the opening, so that the resilient skirt closes a clearance between the shutter leaf and the opening when the shutter leaf is closed.

With the above constituted shutter mechanism, when the shutter leaf closes the opening, the clearance between the shutter leaf and the opening is closed by the resilient skirt, preventing the entry of debris or dust through the clearance. Furthermore, since the resilient skirt can easily deform when in contact with the peripheral edge of the opening, the movement of the shutter leaf is smooth.

If the shutter leaf is rectangularly shaped, and is supported at, and swingable about, one side of the rectangular shutter leaf, the resilient skirt is provided preferably along the side of the rectangular shutter leaf opposite the supported side.

The resilient skirt may be arranged to cover all three remaining sides (i.e., excepting the supported side) to prevent the entry of debris or dust through the clearance between the shutter leaf and the opening on all sides thereof.

The resilient skirt preferably includes a pair of sheet members, respectively attached to the inner and outer surfaces of the shutter leaf, having portions extending toward the peripheral edge of the opening, and attached to each other. Instead of a single pair of sheet members, the resilient skirt may be made of three pairs of sheet members, for covering the three remaining sides (excepting the supported side) of the shutter leaf.

According to another aspect of the invention, a shutter mechanism includes a pair of shutter leaves, swingably provided to disk cartridge insertion opening. The shutter leaves face each other when the shutter leaf closes the opening. At least one of the shutter leaves has a resilient skirt or skirts along a portion facing the remaining shutter leaf. The resilient skirt or skirts of this shutter leaf extends toward the remaining shutter leaf so as to close a clearance between the shutter leaves, when the shutter leaves close the opening.

With the above constituted shutter mechanism, when the shutter leaves close the opening, the entry of debris or dust through the clearance between the shutter leaves is prevented. Furthermore, since the resilient skirt can easily deform when the resilient skirt is in contact with the other shutter leaf, the movement of the shutter leaves are smooth. The resilient skirt may be provided to both shutter leaves along the portions facing each other.

In the case where the shutter leaves are rectangularly shaped, each of the shutter leaves is supported at and swingable about one side of the rectangular shutter leaf. The side opposite to the supported side faces the other shutter leaf. Each shutter leaf may have the resilient skirt along the above opposite side of the shutter leaf. Each resilient skirt may be arranged to cover three remaining sides (excepting the supported side) to prevent the entry of the debris or dust through the clearance between the shutter leaves and the opening as well as through the clearance between the shutter leaves.

DETAILED DESCRIPTION OF THE PREFERRED EMBODIMENTS

Figure 1:
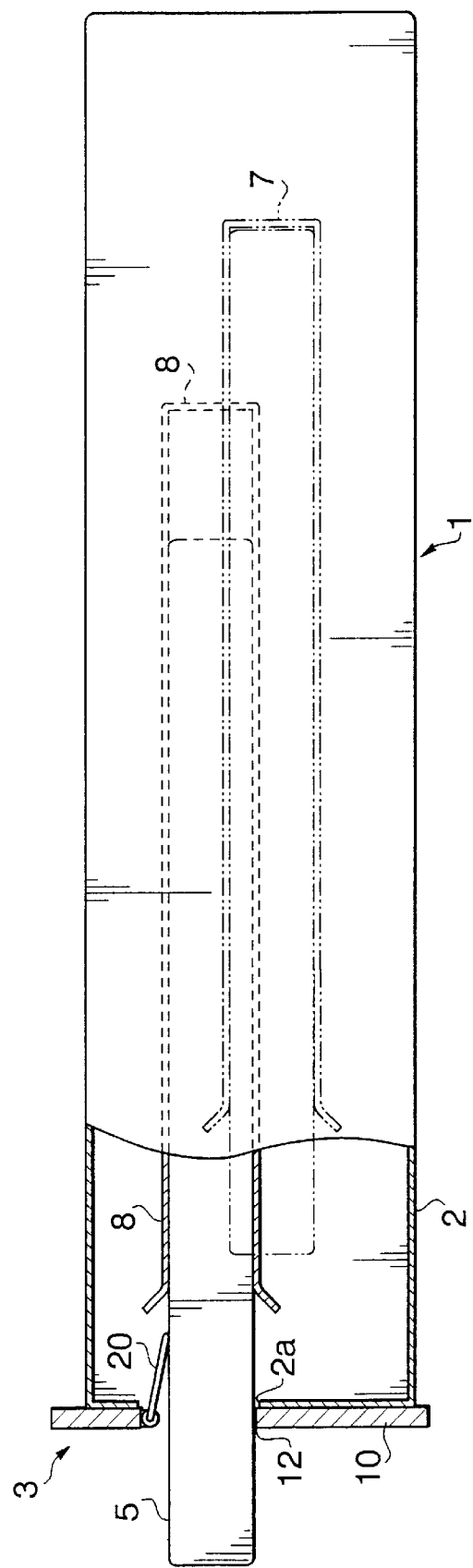
FIG. 1 is a schematic cross-sectional side view of a disk drive device.

FIG. 1 is a cross-sectional view of a shutter mechanism 3 and a disk drive device 1. The disk drive device 1 records or reproduces data from a magneto-optical disk housed in a cartridge 5. The disk drive device 1 has a chassis 2 and a front panel 10 provided to the front side of the chassis 2.

An chassis opening 2a for inserting the cartridge 5 is formed at the front side of the chassis 2. The front panel 10 has a rectangularly shaped panel opening 12 formed therein corresponding to the chassis opening 2a. The cartridge 5 is inserted by hand through the openings 2a and 12 to the disk drive device 1.

A cartridge holder 8 for receiving and holding the inserted cartridge 5 is provided in the disk drive device 1. The cartridge holder 8 is horizontally movable to accept the inserted cartridge 5 into the interior of the disk drive device 1, and downwardly movable to carry the cartridge 5 to a loading position 7. At the loading position, data is recorded on and reproduced from the magneto-optical disk housed in the cartridge 5.

Figure 2:
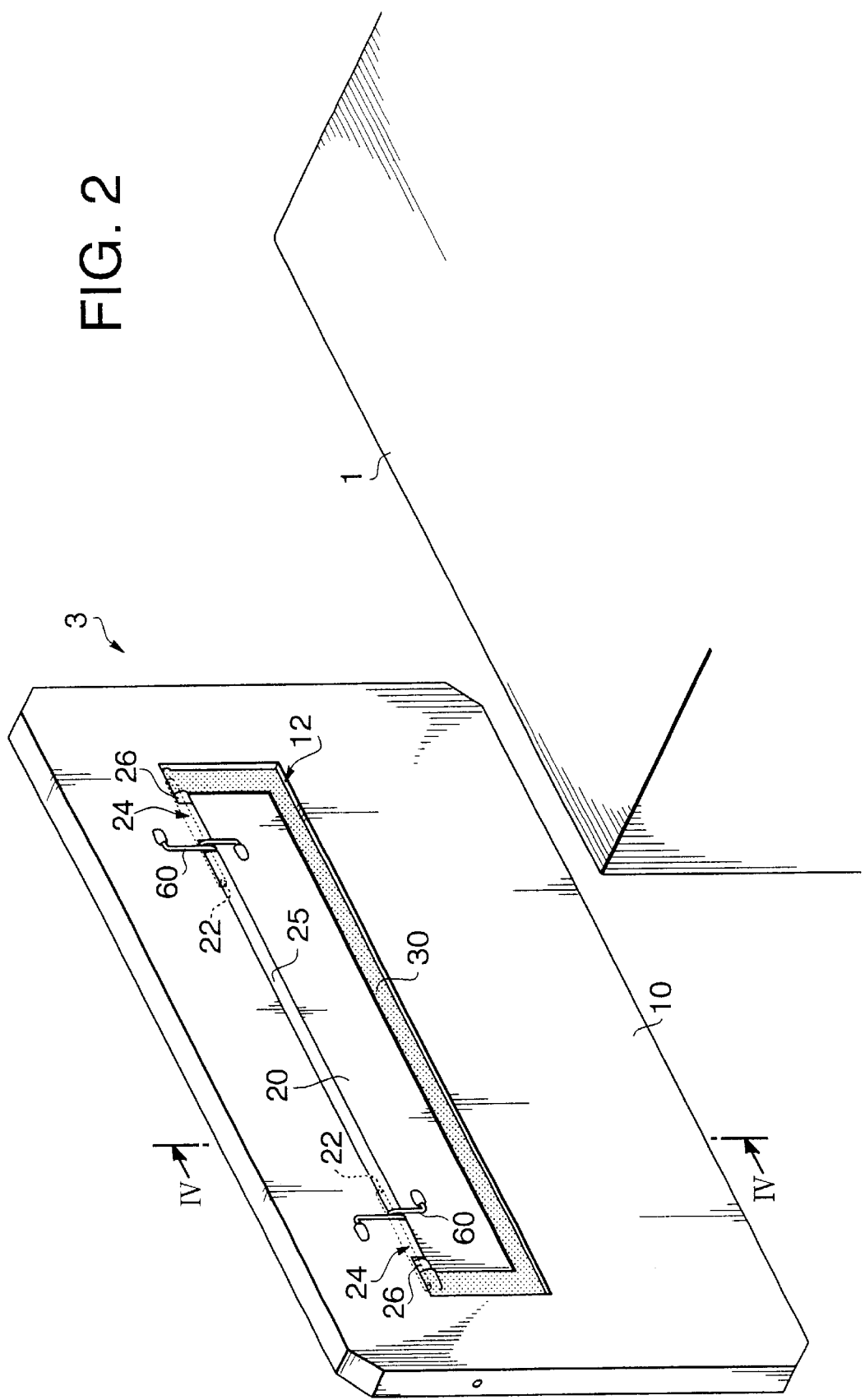
FIG. 2 is a perspective view of a shutter mechanism according to a first embodiment of the present invention.
Figure 3:
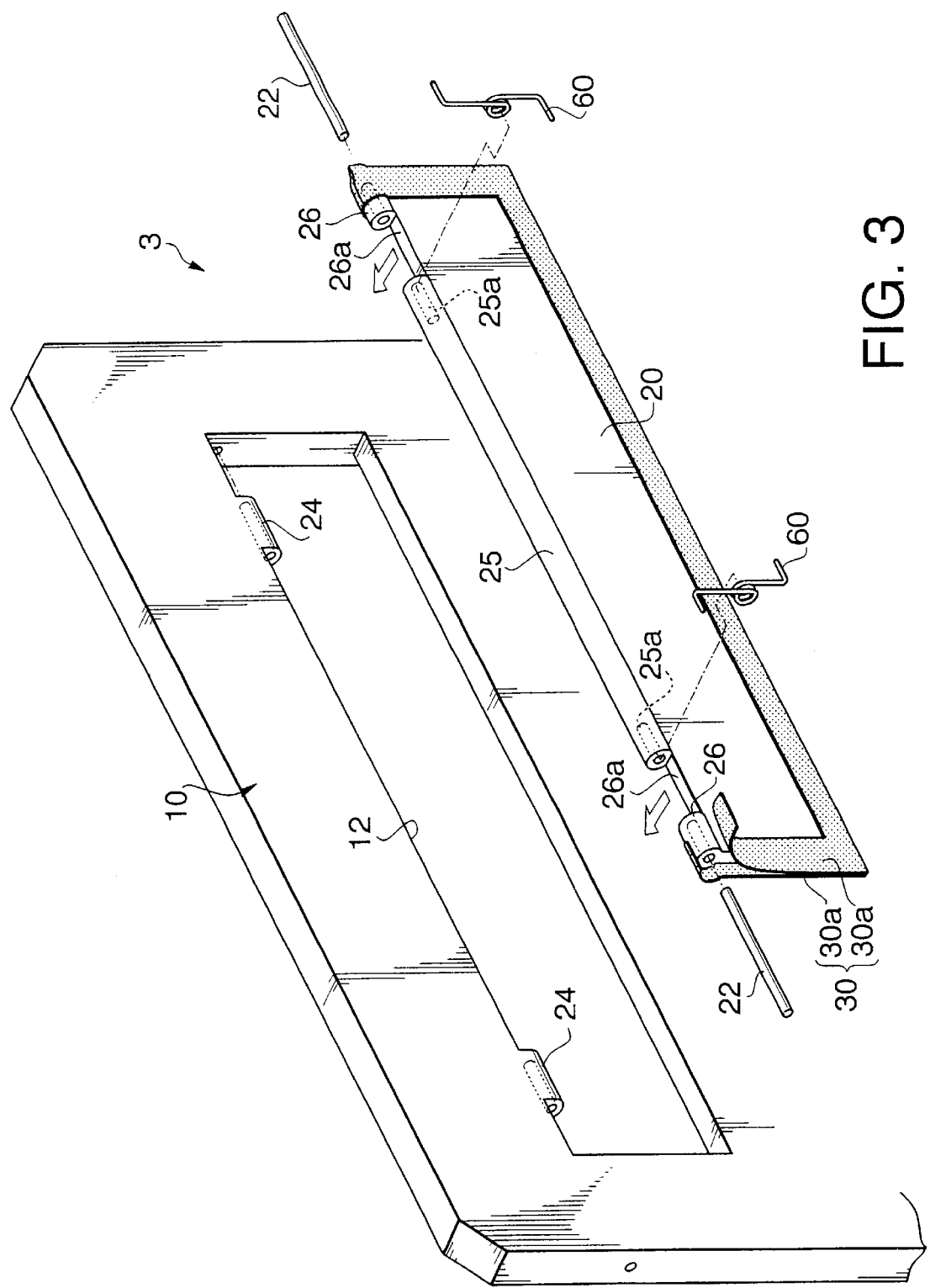
FIG. 3 is an enlarged exploded view showing a shutter leaf and an insertion opening of the disk drive device shown in FIG. 1.

FIG. 2 is an enlarged perspective view of the shutter mechanism 3, and FIG. 3 is an exploded view of the shutter leaf 20 and the front panel 10. As shown in FIG. 2, the panel opening 12 has a rectangular shape. A rectangular shutter leaf 20, preferably formed from resin plastic, is swingably mounted along an upper peripheral edge of the panel opening 12.

As shown in FIG. 3, a center supporting sleeve 25 is formed on the upper side of the shutter leaf 20. A pair of hollow sleeve end portions 26 are formed at both ends of the upper side of the shutter leaf 20, aligned with the center supporting sleeve 25. A notch 26a is formed between the center supporting sleeve 25 and each hollow sleeve end portion 26. The notches 26a, 26a accommodate a pair of hinges 24 provided at the upper peripheral edge of the panel opening 12.

A bore 25a is provided at each lateral end of the center supporting sleeve 25, aligned with the center of the hollow sleeve end portions 26, 26. A pin 22 is inserted, on each side of the center supporting sleeve 25, through each hollow sleeve end portion 26, corresponding hinge 24, and corresponding bore 25a. Each pin 22 is fit loosely to the corresponding hinge 24 and tightly fit into the corresponding hole 25a. Accordingly, the center supporting sleeve 25 is supported by the pins 22, 22, and is thereby supported rotatably about the hinges 24, 24. That is, the shutter leaf 20 is supported at its upper side and swingable about its upper side. Therefore, upon insertion or discharge of the cartridge 5, the shutter leaf 20 is pushed by the cartridge 5 to swing inward or outward.

As shown in FIG. 2, a torsion spring 60 surrounds each pin 22 at each end of the center supporting sleeve 25. One end of the torsion spring 60 is secured to the shutter leaf 20 and the other end is secured to the front panel 10. The torsion springs 60 biases the shutter leaf 20 to a neutral position in which the shutter leaf 20 is parallel to the front panel 10, and substantially closes the panel opening 12. When the shutter leaf 20 swings inward or outward, spring 60 bias leaf 20 to return to the neutral position.

Accordingly, after the shutter leaf 20 is swung inward or outward upon insertion or discharge of the cartridge 5, the shutter leaf 20 immediately returns to the neutral position and substantially closes the panel opening 12.

As shown in FIGS. 2 and 3, a resilient skirt 30 is provided along all three sides of the shutter leaf 20, excepting the supported side (the upper side). The resilient member 30 extends toward the peripheral edge of the panel opening 12, for covering the clearance between the shutter leaf 20 and the panel opening 12.

As shown in FIG. 3, the resilient skirt 30 is made of two rubber sheets 30a, 30a attached to the inner and outer surfaces of the shutter leaf 20 along three sides of the shutter leaf 20 (all sides except the supported side). One rubber sheet 30a is attached to the inner surface of the shutter leaf 20, and one rubber sheet 30a is attached to the outer surface of the shutter leaf 20. Each of the rubber sheets 30a extends toward the peripheral edge of the panel opening 12. The two rubber sheets 30a, 30a are attached face to face where they extend beyond the shutter leaf 20.

Figure 4:
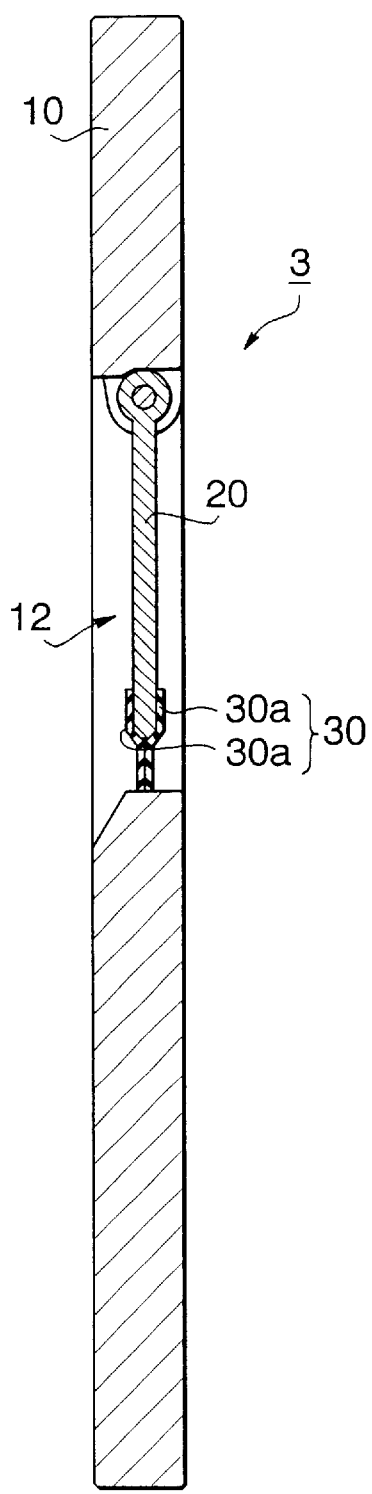
FIG. 4 is a cross-sectional view, along the line IV—IV of FIG. 2.

FIG. 4 is a cross section of the shutter mechanism 3 taken along a line IV—IV in FIG. 2. As shown in FIG. 4, when the shutter leaf 20 is in the neutral position (i.e., closed), the resilient skirt 30 contacts the lower peripheral edge of the panel opening 12. Similarly, the resilient skirt 30 contacts each lateral peripheral edge of the panel opening 12.

When the shutter leaf 20 is in the neutral position, the clearance between the shutter leaf 20 and the peripheral edge of the panel opening 12 is covered by the resilient skirt 30, preventing the entry of debris or dust into the interior of the disk drive device. Furthermore, since the resilient skirt 30 easily deforms, the opening and closing operations of the shutter leaf 20 are smooth.

A second embodiment of a shutter mechanism according to the invention is described with reference to FIGS. 5 through 7.

Figure 5:
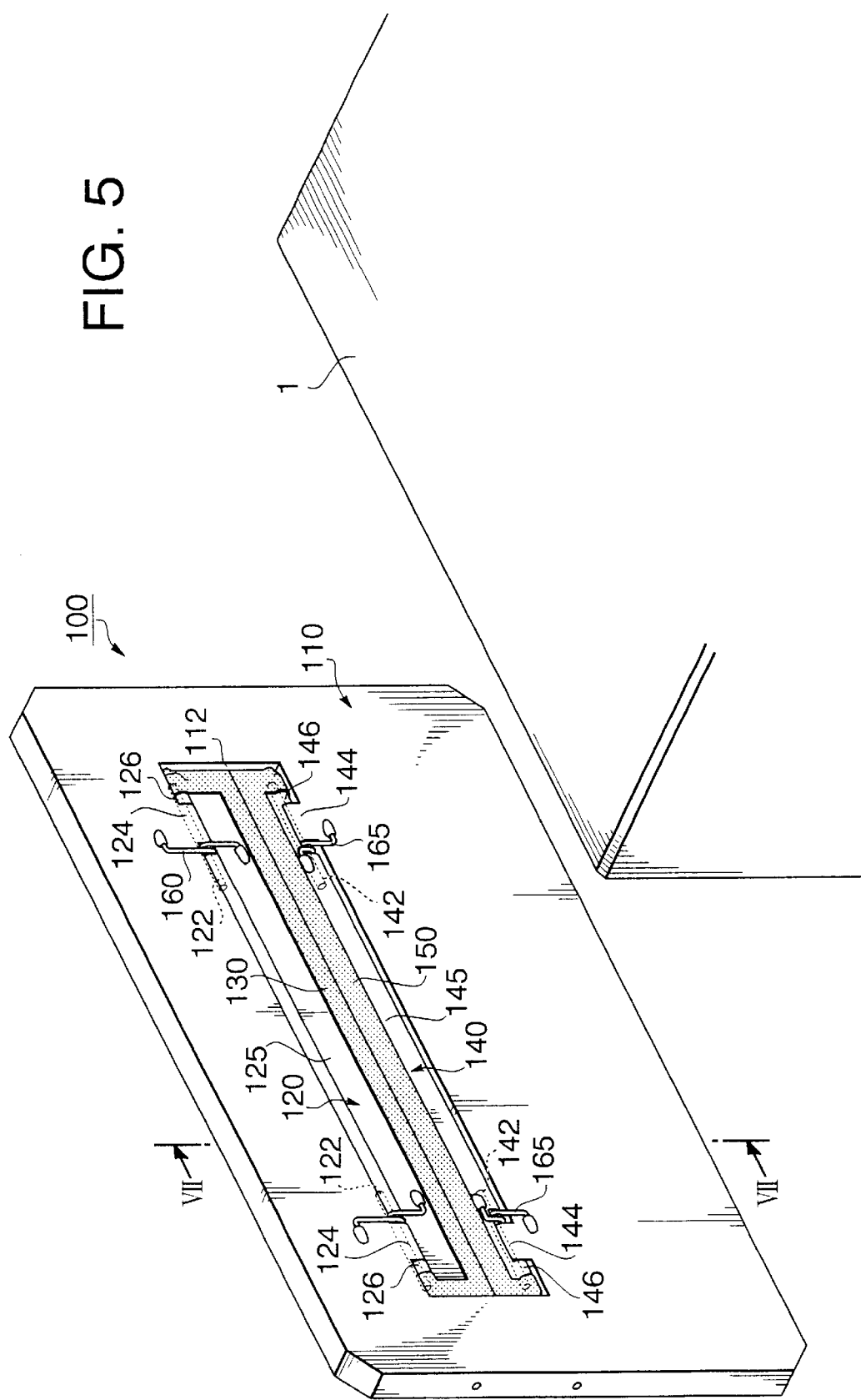
FIG. 5 is a perspective view of a shutter mechanism according to a second embodiment of the present invention.

FIG. 5 is an enlarged perspective view of a shutter mechanism 100 according to a second embodiment of the invention. As shown in FIG. 5, the shutter mechanism 100 is mounted in a rectangular opening 112 formed in a front panel 110. A rectangular upper shutter leaf 120, and a rectangular lower shutter leaf 140 are provided along the upper and lower peripheral edges of the opening 112, respectively. The vertical (short side width) width of the upper shutter leaf 120 is larger than that of the lower shutter leaf 140.

Figure 6:
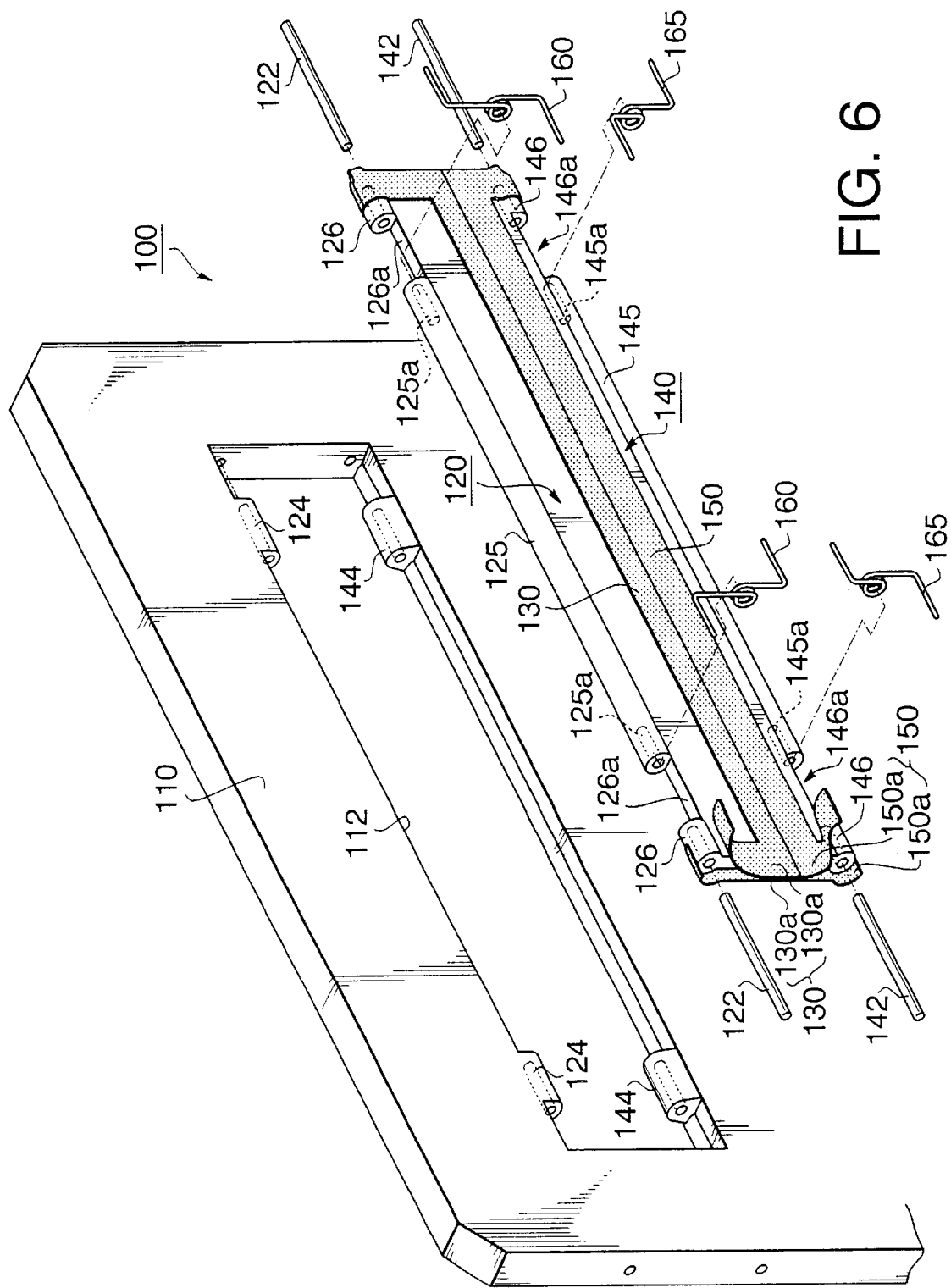
FIG. 6 is an enlarged exploded view showing a shutter leaf and an opening of a disk drive device of FIG. 5.

FIG. 6 is an exploded view showing the shutter leaves 120, 140 and the opening 112 in the front panel 110. A center supporting sleeve 125 is formed along the upper side of the upper shutter leaf 120. A hollow sleeve end portion 126 is formed at each end of the upper side of the upper shutter leaf 120, aligned with the center supporting sleeve 125. A bore 125a is formed in each end of the center supporting sleeve 120, aligned with the hollow sleeve and portions 126, 126. A notch 126a is formed between the center supporting sleeve 125 and each hollow sleeve end portion 126. The notches 126a, 126a fit two hinges 124, 124 along the upper peripheral edge of the opening 112.

A pin 122 is inserted through each hollow sleeve end portions 126, the corresponding hinge 124, and a corresponding bore 125a, at both ends of the center supporting sleeve 120. Each pin 122 is loosely fit to the corresponding hinge 124 and tightly fit into the corresponding hole 125a. Accordingly, the center supporting sleeve 125 is supported by the pins 122, 122, and the upper shutter leaf 120 is thereby rotatably supported by the hinges 124, 124.

Similarly, a center supporting sleeve 145 is formed along the lower side of the lower shutter leaf 140. A hollow sleeve end portion 146 is formed at each end of the lower side of the lower shutter leaf 140, aligned with the center supporting sleeve 145. A bore 145a is formed in each end of the center supporting sleeve 140, aligned with the hollow sleeve end portions 146, 146. A notch 146a is formed between the center supporting sleeve 145 and each hollow sleeve end portion 146. The notches 146a, 146a fit two hinges 144, 144 along the lower peripheral edge of the opening 112.

A pin 142 is inserted through each hollow sleeve end portions 146, the corresponding hinge 144, and a corresponding bore 145a, at both ends of the center supporting sleeve 140. Each pin 142 is loosely fit to the corresponding hinge 144 and tightly fit into the corresponding hole 145a. Accordingly, the center supporting sleeve 145 is supported by the pins 142, 142, and the lower shutter leaf 140 is thereby rotatably supported by the hinges 144, 144.

Therefore, the upper shutter leaf 120 is supported at and swingable about its upper side, and the lower shutter leaf 140 is supported at and swingable about its lower side. That is, upon insertion or discharge of the cartridge 5, the shutter leaves 120 and 140 are pushed by the cartridge 5 to swing inward or outward.

As shown in FIG. 5, a torsion spring 160 surrounds each pin 122 at each end of the center supporting sleeve 125. One end of the torsion spring 160 is secured to the upper shutter leaf 120 and the other end is secured to the front panel 110. The torsion springs 160 bias the upper shutter leaf 120 to a neutral position in which the upper shutter leaf 120 is parallel to the front panel 110 and substantially closes the panel opening 112 (together with the lower shutter leaf 140). When the upper shutter leaf 120 swings inward or outward, the upper shutter leaf 120 is biased to return to the neutral position.

Similarly, a torsion spring 165 surrounds each pin 142 at each end of the center supporting sleeve 145. One end of the torsion spring 165 is secured to the lower shutter leaf 140 and the other end is secured to the front panel 110. The torsion springs 165 bias the lower shutter leaf 140 to a neutral position in which the lower shutter leaf 140 is parallel to the front panel 110 and substantially closes the panel opening 112 (together with the upper shutter leaf 120). When the lower shutter leaf 140 is swung inward or outward, the lower shutter leaf 140 is biased to return to the neutral position.

Accordingly, immediately after the shutter leaves 120 and 140 swing upon insertion or discharge of the cartridge 5, the shutter leaves 120 and 140 return to the neutral position and substantially close the opening 112.

As shown in FIG. 6, an upper resilient skirt 130 is provided along all three unsupported sides of the upper shutter leaf 120, and a lower resilient skirt 150 is provided along all three unsupported sides of the lower shutter leaf 140. The upper resilient skirt 130 extends to the lateral peripheral edges of the opening 112 and toward the lower resilient skirt 150. Similarly and symmetrically, the lower resilient skirt 150 extends to the lateral peripheral edges of the opening 112 and toward the upper resilient skirt 130. Together, the upper and lower resilient skirts 130 and 150 cover the clearance between the shutter leaves 120, 140 and the opening 112.

Preferably, each of the upper and lower resilient skirts 130, 150 includes two facing rubber sheets. That is, the upper resilient skirt 130 includes rubber sheets 130a, 130a applied to the inner and outer surfaces along the three unsupported sides of the upper shutter leaf 120. Similarly, the lower resilient skirt 150 includes rubber sheets 150a, 150a applied to the inner and outer surfaces three unsupported sides of the lower shutter leaf 140. Each of the rubber sheets 130a extends toward the lateral peripheral edges of the panel opening 112 and toward the opposing rubber sheets 150a, while each of the rubber sheets 150a extends toward the lateral peripheral edges of the panel opening 112 and toward the opposing rubber sheet 130a. The two rubber sheets 130a, 130a are attached face to face where they extend beyond the shutter leaf 120, and the two rubber sheets 150a, 150a are attached face to face where they extend beyond the shutter leaf 140.

Figure 7:
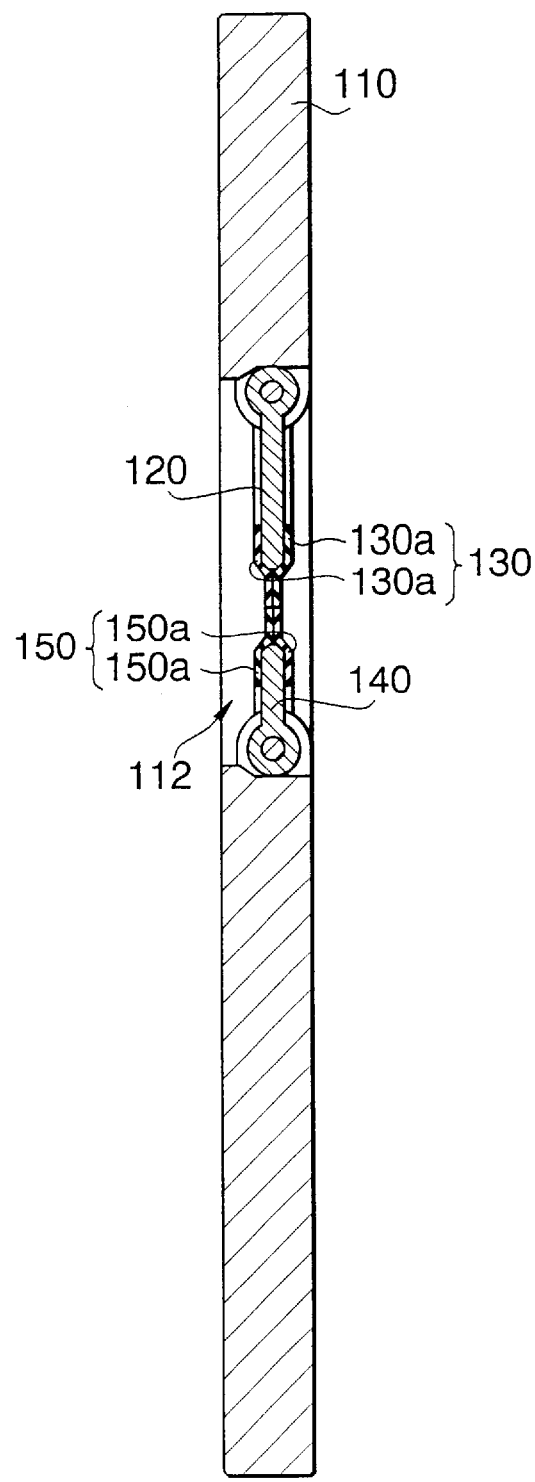
FIG. 7 is a cross-sectional view, along the line VII—VII of FIG. 5.

FIG. 7 is a cross section of the second embodiment of a shutter mechanism according to the invention, taken along the line VII—VII in FIG. 5. As shown in FIG. 7, the upper resilient skirt 130 and the lower resilient skirt 150 oppose and contact one another when the upper and lower shutter leaves 120 and 140 are in neutral positions (i.e., closed, or upright, positions). Similar to the first embodiment, the upper and lower resilient skirts 130 and 150 also contact the lateral peripheral edges of the insertion opening 112 when the upper and lower shutter leaves 120 and 140 are in neutral positions, covering the clearance between the upper and lower shutter leaves 120 and 140 and the insertion opening 112.

When the upper and lower shutter leaves 120 and 140 are in neutral positions, the clearance between the upper shutter leaf 120 and the lower shutter leaf 140, as well as the clearance between the upper and lower shutter leaves 120 and 140 and the lateral edges of the panel opening 12, are covered by the upper and lower resilient skirts 130 and 150 so as to prevent the entry of debris or dust into the interior of the disk drive device 1. Furthermore, since the resilient skirts 130, 150 easily deform, opening and closing of the upper and lower shutter leaves 120 and 140 is smooth.

Figure 8:
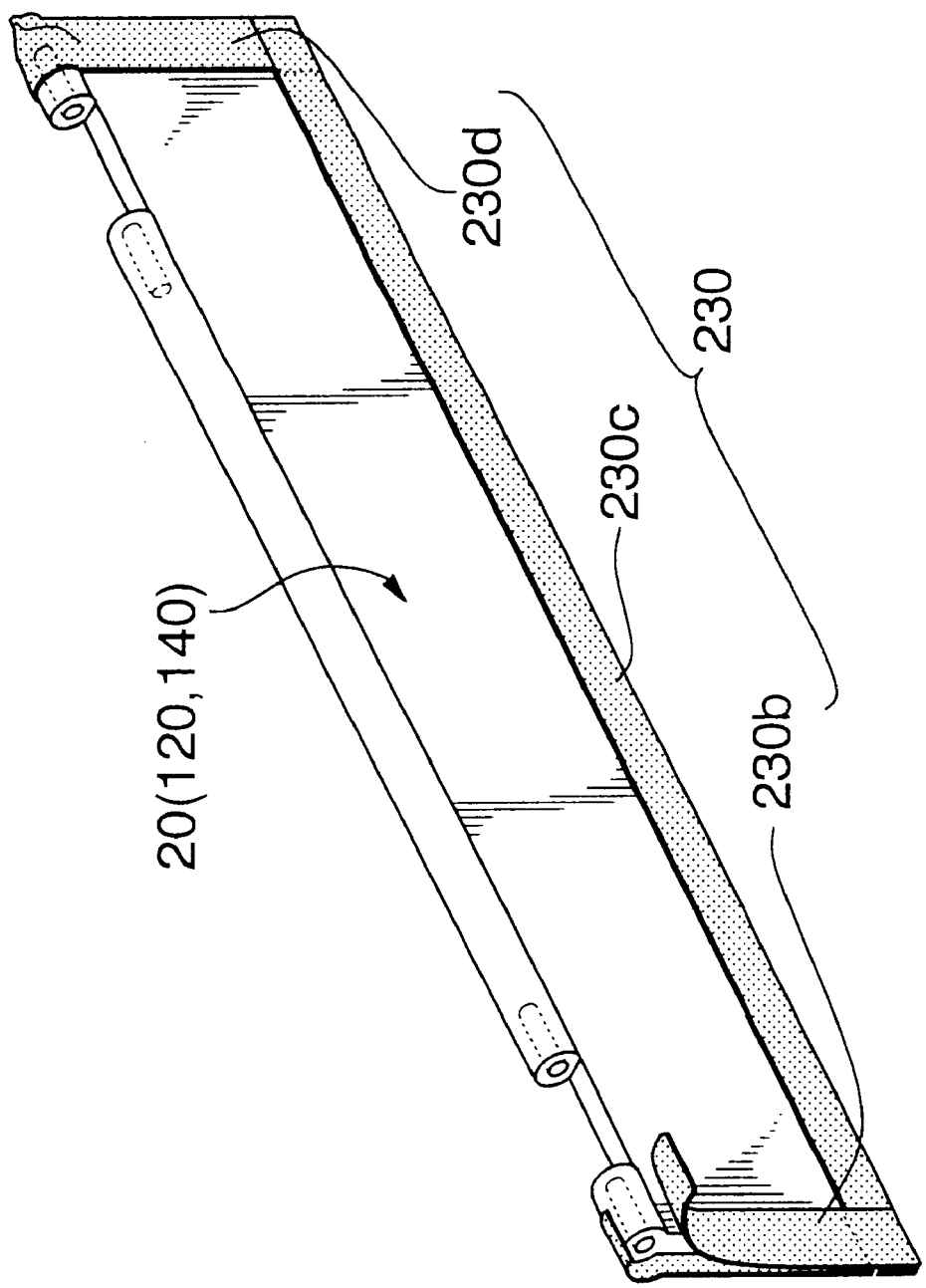
FIG. 8 is a perspective view of a variation of a resilient skirt applicable to the shutter leaves shown in FIGS. 3 and 6.

FIG. 8 shows an variation of a resilient skirt 230, applicable to any of the shutter leaves 20, 120, or 140 as described above. As shown in FIG. 8, instead of being formed from opposing pairs of U-shaped rubber sheets as in the first and second embodiments, the resilient skirt 230 is formed of three pairs of sheet members arranged to cover respective sides of the of the exemplary shutter leaf 20. Specifically, the resilient skirt 230 includes a pair of short side sheet members 230d, 230d, a pair of long side sheet members 230b, 230b, and a pair of bottom sheet members 230c, 230c. Each one of the pair of short side members 230d is attached to a side edge surface of the exemplary shutter leaf 20, extends beyond the exemplary shutter leaf 20, and is attached face-to face with one of the pair of long side members 230b. Each one of the pair of long side members 230b is attached to the exemplary shutter leaf 20 similarly to the short side members 230d, and is further attached at a bottom end to a facing bottom side member 230c. As shown in FIG. 8, the three pairs of sheet members are attached in a staggered and overlapping fashion so that the thickness of the resilient skirt 230 is always at least two sheet thick. However, any staggered and overlapped arrangement to allow two sheet thick may be used.

As described above, the embodiments of a shutter mechanism according to the invention the entry of debris or dust into a disk drive device through the clearance between a shutter leaf or leaves and a cartridge insertion opening.

The present disclosure relates to subject matter contained in Japanese Patent Application No. HEI 07-170234, filed on Jun. 13, 1995, which is expressly incorporated herein by reference in its entirety.

What is claimed is:

1. A shutter mechanism for a disk cartridge insertion opening of a disk drive device, said shutter mechanism comprising:

a shutter leaf swingably mounted in said opening, said shutter leaf being swingable about a swing axis both inwardly towards an inner position, and outwardly towards an outer position, with respect to said disk drive device, and having a length in a direction perpendicular to said swing axis which is shorter than a dimension of said insertion opening in said direction to define a gap between an end of said shutter leaf and an adjacent peripheral surface of said insertion opening; and at least one resilient skirt along at least a portion of a periphery of said shutter leaf, said resilient skirt extending toward and contacting said adjacent peripheral surface of said insertion opening so that said resilient skirt substantially covers said gap between said shutter leaf and said insertion opening when said shutter leaf is in a closed position, said resilient skirt contacting said adjacent peripheral surface when in the closed position between said inner and outer positions.

2. The shutter mechanism according to claim 1, wherein said shutter leaf and said opening are rectangular, said shutter leaf is supported by and swingable about, one side of said opening, and the remaining sides of said shutter leaf are unsupported.

3. The shutter mechanism according to claim 2, wherein said resilient skirt is provided along a side opposite to said one side.

4. The shutter mechanism according to claim 2, wherein said resilient skirt is provided to all of said remaining sides of said shutter leaf.

5. The shutter mechanism according to claim 4, wherein said resilient skirt comprises:
a single pair of sheet members for covering three sides of said shutter leaf, each one of said single pair of sheet members being respectively attached to an inner and an outer surface of said shutter leaf, said single pair of sheet members including:
extending portions extending toward said peripheral surface of said opening; and
attaching portions attaching each one of said single pair of sheet members to each other.

6. The shutter mechanism according to claim 4, wherein said resilient skirt includes:
three pairs of sheet members for covering said remaining sides of said shutter leaf, one of each of said pairs of sheet members being respectively attached to an inner and an outer surface of said shutter leaf, and each of said pairs of sheet members including:
extending portions extending toward said peripheral surface of said opening; and
attaching portions attaching said pairs of sheet members together.

7. The shutter mechanism according to claim 1, wherein said resilient skirt comprises:
a pair of sheet members, each one of said pair of sheet members being respectively attached to an inner and an outer surface of said shutter leaf, and said pair of sheet members including:
extending portions extending toward said peripheral surface of said opening; and
attaching portions attaching each one of said pair of sheet members to each other.

8. The shutter mechanism according to claim 1, wherein said resilient skirt is rubber.

9. The shutter mechanism according to claim 1, wherein said disk drive device has a chassis and a panel provided to said chassis, said shutter leaf being provided to said panel.

10. The shutter mechanism of claim 1, wherein a side of said shutter leaf having the largest surface area defines a plane, and said at least one resilient skirt extends from said shutter leaf in said plane.

11. The shutter mechanism of claim 10, wherein a surface area of said shutter leaf in said plane is smaller than a combined surface area of said shutter leaf and said at least one resilient skirt in said plane.

12. A shutter mechanism for a disk cartridge insertion opening of a disk drive device, said shutter mechanism comprising:
a pair of shutter leaves swingable about a pair of swing axes mounted in said opening, said shutter leaves mounted on opposing sides of said opening and facing each other when said shutter leaves are in a closed position, said shutter leaves being swingable both inwardly and outwardly of said disk drive device, a total length of said pair of shutter leaves in a direction perpendicular to said pair of swing axes being shorter than a dimension of said insertion opening in said direction to define a gap between an adjacent end of each of said pair of shutter leaves; and
at least one resilient skirt along at least a portion of a peripheral end of at least one of said pair of shutter leaves, said at least one resilient skirt extending toward the remaining one of said pair of shutter leaves so that said at least one resilient skirt covers said gap between said pair of shutter leaves when in said closed position.

13. The shutter mechanism according to claim 12, wherein said at least one resilient skirt includes a resilient skirt, provided to each one of said pair of said shutter leaves and extending toward each other.

14. The shutter mechanism according to claim 12, wherein said at least one resilient skirt comprises:
a pair of sheet members, each one of said pair of sheet members being respectively attached to an inner and an outer surface of said at least one of said pair of shutter leaves, said pair of sheet members including:
extending portions extending toward a peripheral surface of said opening; and
attaching portions attaching each one of said pair of sheet members to each other.

15. The shutter mechanism according to claim 12, wherein each one of said pair of shutter leaves is rectangular and is supported by, and swingable about, one side of said opening, the remaining sides of each one of said pair of shutter leaves being unsupported, and each one of said pair of shutter leaves having one of said remaining sides facing the other of said pair of shutter leaves.

16. The shutter mechanism according to claim 15, wherein said at least one resilient skirt is provided along said remaining sides of said pair of shutter leaves.

17. The shutter mechanism according to claim 15, wherein said at least one resilient skirt is provided along said remaining sides of at least one of said pair of shutter leaves.

18. The shutter mechanism according to claim 17, wherein said at least one resilient skirt comprises:
a single pair of sheet members for covering three sides of said at least one of said pair of said shutter leaves, each one of said single pair of sheet members being respectively attached to an inner and an outer surface of said at least one of said pair of shutter leaves, and said single pair of sheet members including:
extending portions extending toward a peripheral surface of said opening; and
attaching portions attaching each one of said single pair of sheet members to each other.

19. The shutter mechanism according to claim 17, wherein said at least one resilient skirt includes:

three pairs of sheet members for covering three of said remaining sides of said at least one of said pair of shutter leaves, one of each of said pairs of sheet members being respectively attached to an inner and an outer surface of said at least one of said pair of shutter leaves, and each of said pairs of sheet members including:

extending portions extending toward a peripheral surface of said opening; and attaching portions attaching said pairs of sheet members together.

20. The shutter mechanism according to claim 12, wherein said at least one resilient skirt is rubber.

21. The shutter mechanism according to claim 12, wherein one of said pair of shutter leaves is larger than a remaining one of said pair of shutter leaves.

22. The shutter mechanism according to claim 12, wherein said disk drive device has a chassis and a panel provided to said chassis, said shutter leaves being provided to said panel.

23. The shutter mechanism of claim 12, wherein a side of said at least one of said pair of shutter leaves having the largest surface area defines a plane, and said at least one resilient skirt extends from said at least one of said pair of shutter leaves in said plane.

24. The shutter mechanism of claim 23, wherein a surface area of said at least one of said pair of shutter leaves in said plane is smaller than a combined surface area of said at least one of said pair of shutter leaves and said at least one resilient skirt in said plane.

* * * * *

UNITED STATES PATENT AND TRADEMARK OFFICE
CERTIFICATE OF CORRECTION

PATENT NO.    : 6,411,583 B1
DATED         : June 25, 2002
INVENTOR(S)   : Yamamoto et al.

It is certified that error appears in the above-identified patent and that said Letters Patent is hereby corrected as shown below:

<u>Title page,</u>
Insert -- [*] Notice:    Under 35 U.S.C. 154(b), the term of this patent shall be extended for 920 days. --.

Signed and Sealed this

Twenty-seventh Day of May, 2003

JAMES E. ROGAN
*Director of the United States Patent and Trademark Office*